(12) United States Patent
Bankoski et al.

(10) Patent No.: US 8,638,863 B1
(45) Date of Patent: Jan. 28, 2014

(54) APPARATUS AND METHOD FOR FILTERING VIDEO USING EXTENDED EDGE-DETECTION

(75) Inventors: James Bankoski, Wyantskill, NY (US); Paul Wilkins, Cambridge (GB); Yaowu Xu, San Diego, CA (US)

(73) Assignee: Google Inc., Mountain View, CA (US)

( * ) Notice: Subject to any disclaimer, the term of this patent is extended or adjusted under 35 U.S.C. 154(b) by 270 days.

(21) Appl. No.: 13/110,283

(22) Filed: May 18, 2011

Related U.S. Application Data

(60) Provisional application No. 61/345,976, filed on May 18, 2010.

(51) Int. Cl.
*H04N 11/02* (2006.01)

(52) U.S. Cl.
USPC ..................................... 375/240.29

(58) Field of Classification Search
USPC ....................... 375/240.01–240.29
See application file for complete search history.

(56) References Cited

U.S. PATENT DOCUMENTS

| | | | |
|---|---|---|---|
| 6,285,801 B1 * | 9/2001 | Mancuso et al. | 382/268 |
| 6,621,867 B1 * | 9/2003 | Sazzad et al. | 375/240.26 |
| 6,807,317 B2 * | 10/2004 | Mathew et al. | 382/266 |
| 7,054,367 B2 * | 5/2006 | Oguz et al. | 375/240.23 |
| 7,088,351 B2 * | 8/2006 | Wang | 345/204 |
| 7,277,592 B1 * | 10/2007 | Lin | 382/268 |
| 7,447,337 B2 * | 11/2008 | Zhang et al. | 382/107 |
| 7,492,823 B2 * | 2/2009 | Lee et al. | 375/240.16 |
| 7,657,098 B2 * | 2/2010 | Lin et al. | 382/199 |
| 8,111,914 B2 | 2/2012 | Lee et al. | |
| 8,200,028 B2 * | 6/2012 | Gabso et al. | 382/232 |
| 8,218,629 B2 * | 7/2012 | Lee et al. | 375/240.12 |
| 8,295,367 B2 * | 10/2012 | Tang et al. | 375/240.29 |
| 2003/0053708 A1 * | 3/2003 | Kryukov et al. | 382/261 |
| 2003/0053711 A1 * | 3/2003 | Kim | 382/268 |
| 2006/0013315 A1 * | 1/2006 | Song | 375/240.24 |
| 2007/0110152 A1 * | 5/2007 | Lee et al. | 375/240.03 |
| 2008/0298472 A1 * | 12/2008 | Jain et al. | 375/240.29 |
| 2009/0161770 A1 * | 6/2009 | Dong et al. | 375/240.29 |
| 2010/0034268 A1 | 2/2010 | Kusakabe et al. | |

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May, 2003.

(Continued)

*Primary Examiner* — David Czekaj
*Assistant Examiner* — Leron Beck
(74) *Attorney, Agent, or Firm* — Young Basile Hanlon & MacFarlan P.C.

(57) ABSTRACT

A system, apparatus, and method for filtering a decoded video stream having a plurality of frames, each frame having a plurality of blocks. The method can include selecting a current block from a current frame of the plurality of frames and an adjacent block from the current frame of the plurality of frames, the current block being adjacent to and sharing an edge with the adjacent block and filtering the edge between the current block and the adjacent block using a processor if an output from an edge-detection function of the values of at least four pixels located about the edge and within a line of pixels extending through both the current block and the adjacent block is less than an edge threshold.

7 Claims, 5 Drawing Sheets

(56) References Cited

OTHER PUBLICATIONS

"Series H: Audiovisual and multimedia systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 20026.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstrea, & Decoder Specification". Version 1.03. On2 Technologies, Inc. Dated Oct. 29, 2007.

"Series H: Audiovisual and Multimedia Systems; Infrastructure of audiovisual servies—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual servies—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual servies—Coding of moving video". H.264. Advanced video coding for generic audiovisual servies. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

\* cited by examiner

APPARATUS AND METHOD FOR FILTERING VIDEO USING EXTENDED EDGE-DETECTION

CROSS REFERENCE TO RELATED APPLICATIONS

This application claims priority to U.S. Provisional Patent Application Ser. No. 61/345,976, filed May 18, 2010, which is incorporated herein in its entirety.

TECHNICAL FIELD

The present disclosure relates in general to video encoding and decoding.

BACKGROUND

An increasing number of applications today make use of digital media for various purposes including, for example, remote business meetings via video conferencing, high definition video entertainment, video advertisements, and sharing of user-generated videos. As technology is evolving, users have higher expectations for media quality and, for example, expect high resolution video even when transmitted over communications channels having limited bandwidth.

To permit transmission of digital video streams while limiting bandwidth consumption, a number of video compression schemes have been devised, including formats such as VPx, promulgated by Google, Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

SUMMARY

Disclosed herein are exemplary approaches to filter video using extended edge-detection.

In one exemplary approach, a method of filtering a decoded video stream having a plurality of frames, each frame having a plurality of blocks is disclosed. The method includes selecting a current block from a current frame of the plurality of frames and an adjacent block from the current frame of the plurality of frames, the current block being adjacent to and sharing an edge with the adjacent block and filtering the edge between the current block and the adjacent block using a processor if an output from an edge-detection function of the values of at least four pixels located about the edge and within a line of pixels extending through both the current block and the adjacent block is less than an edge threshold.

In another exemplary approach, a method of filtering a video stream having a plurality of frames, each frame having a plurality of blocks is disclosed. The method includes determining an edge-detection result from an edge detection function of the values of at least four pixels within a line of pixels extending through a current block and an adjacent block, both blocks sharing an edge and being within a current frame of the plurality of frames and filtering the edge between current block and the adjacent block using a processor if the edge-detection result is less than an edge threshold.

In another exemplary approach, a computing device for filtering a decoded video stream having a plurality of frames, each frame having a plurality of blocks is disclosed. The computing device includes a memory and a processor configured to execute instructions stored in the memory to: select a current block from a current frame of the plurality of frames and an adjacent block from the current frame of the plurality of frames, the current block being adjacent to and sharing an edge with the adjacent block and filter the edge between current block and the adjacent block if a comparison between a function of the values of at least four pixels within a line of pixels extending through both the current block and the adjacent block is less than an edge threshold.

These and other exemplary approaches will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
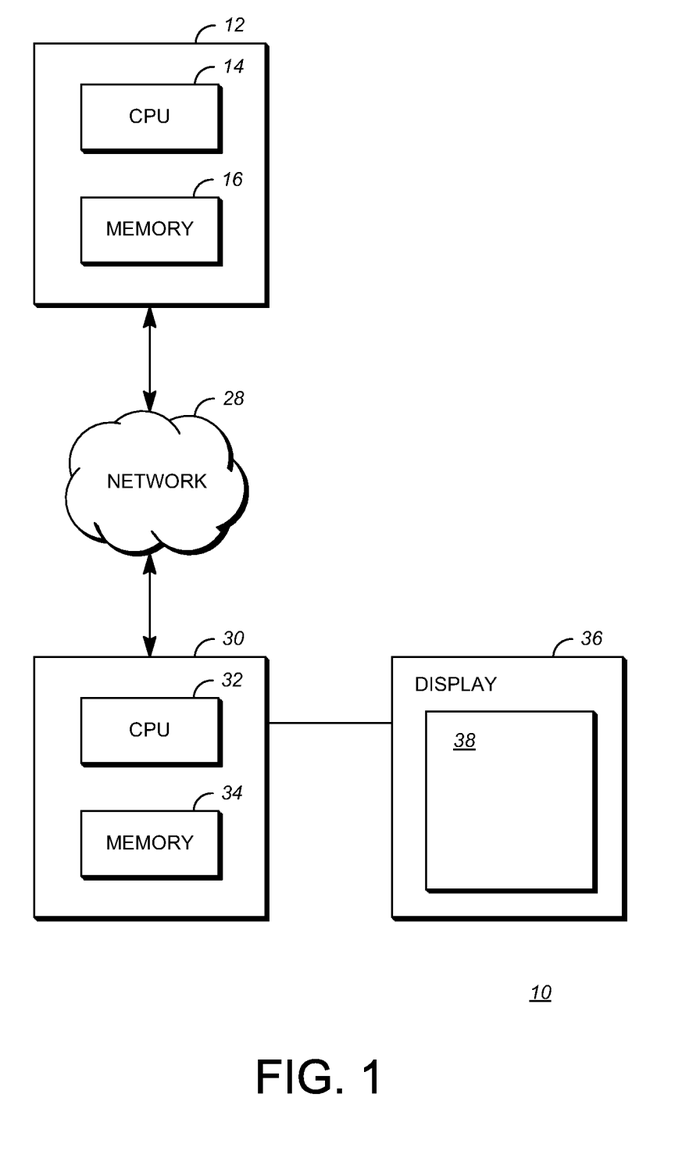
FIG. 1 is a schematic of a video encoding and decoding system.

FIG. 1 is a diagram of an encoder and decoder system 10 for still or dynamic video images. An exemplary transmitting station 12 may be, for example, a computer having an internal configuration of hardware including a processor such as a central processing unit (CPU) 14 and a memory 16. CPU 14 can be a controller for controlling the operations of transmitting station 12. The CPU 14 is connected to memory 16 by, for example, a memory bus. Memory 16 may be random access memory (RAM) or any other suitable memory device. Memory 16 can store data and program instructions which are used by the CPU 14. Other suitable implementations of transmitting station 12 are possible.

A network 28 connects transmitting station 12 and a receiving station 30 for encoding and decoding of the video stream. Specifically, the video stream can be encoded by an encoder in transmitting station 12 and the encoded video stream can be decoded by a decoder in receiving station 30. Network 28 may, for example, be the Internet. Network 28 may also be a local area network (LAN), wide area network (WAN), virtual private network (VPN), or any other means of transferring the video stream from transmitting station 12.

Receiving station 30, in one example, may be a computer having an internal configuration of hardware include a processor such as a central processing unit (CPU) 32 and a memory 34. CPU 32 is a controller for controlling the operations of transmitting station 12. CPU 32 can be connected to memory 34 by, for example, a memory bus. Memory 34 may be RAM or any other suitable memory device. Memory 34 stores data and program instructions which are used by CPU 32. Other suitable implementations of receiving station 30 are possible.

A display 36 configured to display a video stream can be connected to receiving station 30. Display 36 may be implemented in various ways, including by a liquid crystal display (LCD) or a cathode-ray tube (CRT). The display 36 can be configured to display a video stream decoded by the decoder in receiving station 30.

Other implementations of the encoder and decoder system 10 are possible. For example, one implementation can omit the network 28 and/or the display 36. In another implementation, a video stream may be encoded and then stored for transmission at a later time by receiving station 12 or any other device having memory. In another implementation, additional components may be added to the encoder and decoder system 10. For example, a display or a video camera may be attached to transmitting station 12 to capture the video stream to be encoded.

Figure 2:
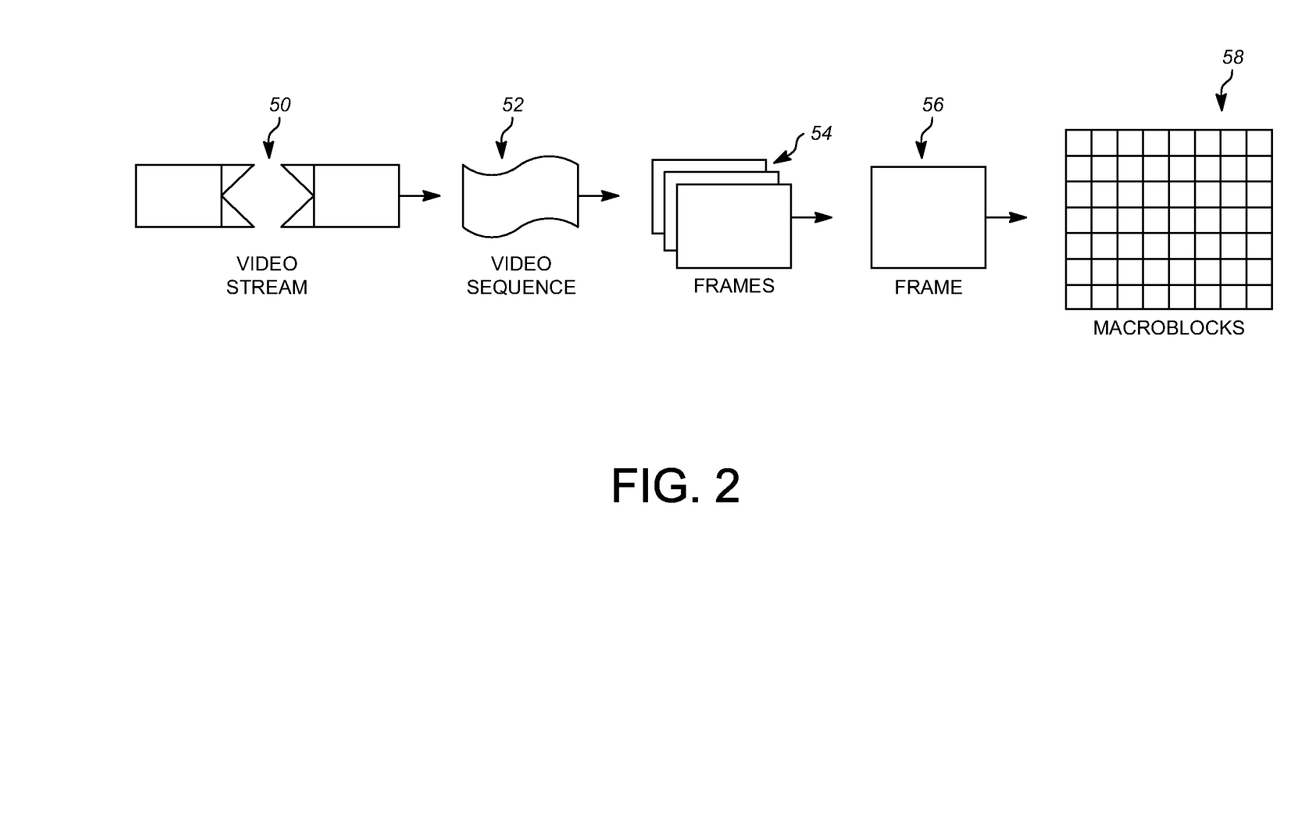
FIG. 2 is a diagram of a video bitstream.

FIG. 2 is a diagram a typical video stream 50 to be encoded and decoded. Video coding formats, such as VP8 or H.264, provide a defined hierarchy of layers for video stream 50. Video stream 50 includes a video sequence 52. At the next level, video sequence 52 consists of a number of adjacent frames 54, which can then be further subdivided into a single frame 56. At the next level, frame 56 can be divided into a series of blocks or macroblocks 58, which can contain data corresponding to, for example, a 16×16 block of displayed pixels in frame 56. Each block can contain luminance and chrominance data for the corresponding pixels. Blocks 58 can also be of any other suitable size such as 16×8 pixel groups or 8×16 pixel groups. Herein, unless otherwise stated, the terms macroblocks and blocks are used interchangeably.

Figure 3:
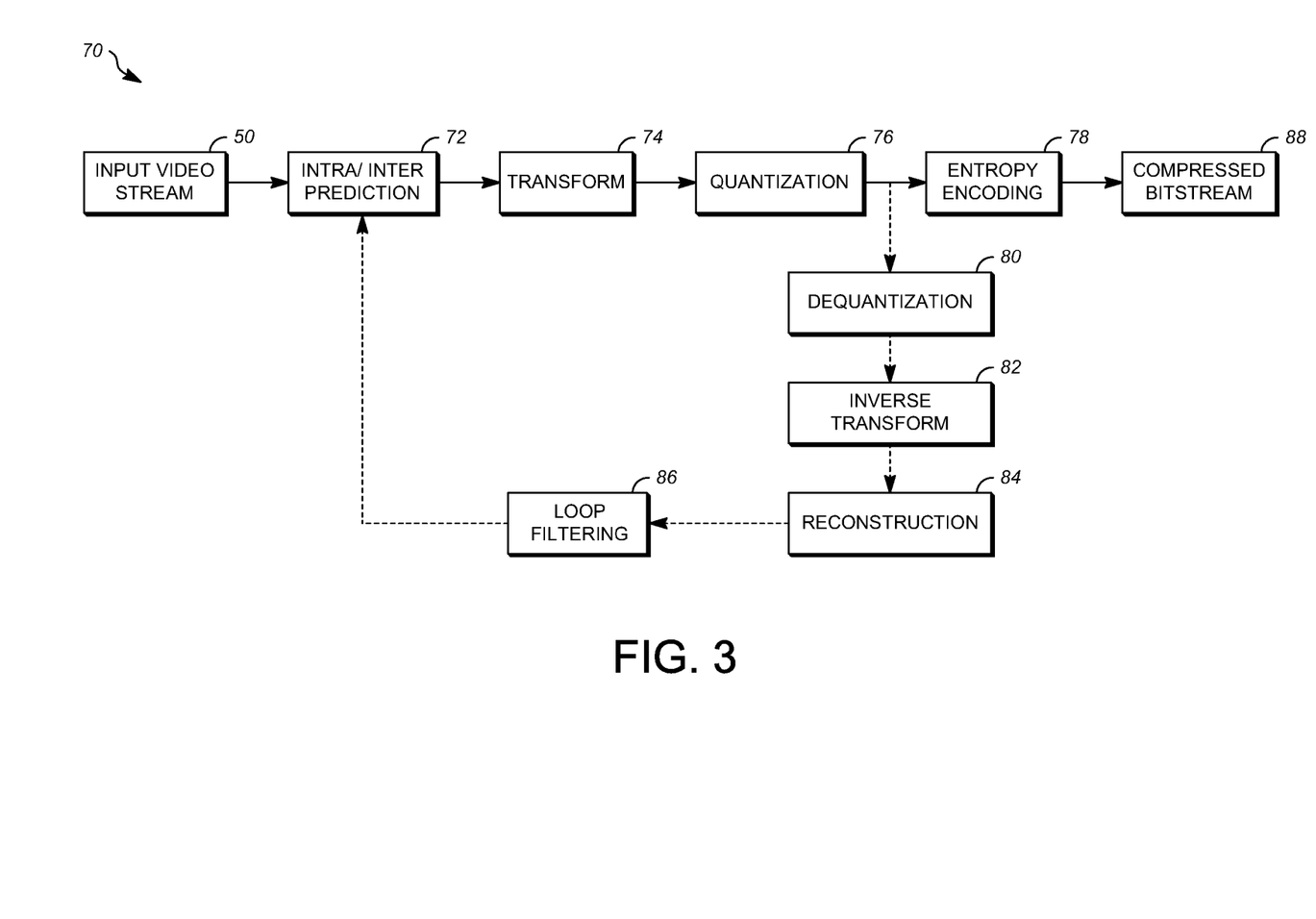
FIG. 3 is a block diagram of an encoder within the video encoding and decoding system of FIG. 1.

FIG. 3 is a block diagram of an encoder 70 within the video encoding and decoding system 10 of FIG. 1. An encoder 70 encodes an input video stream 50. Encoder 70 has the following stages to perform the various functions in a forward path (shown by the solid connection lines) to produce an encoded or a compressed bitstream 88: an intra/inter prediction stage 72, a transform stage 74, a quantization stage 76 and an entropy encoding stage 78. Encoder 70 also includes a reconstruction path (shown by the dotted connection lines) to reconstruct a frame for encoding of further macroblocks. Encoder 70 has the following stages to perform the various functions in the reconstruction path: a dequantization stage 80, an inverse transform stage 82, a reconstruction stage 84 and a loop filtering stage 86. Other structural variations of encoder 70 can be used to encode input video stream 50.

When input video stream 50 is presented for encoding, each frame 56 within input video stream 50 is processed in units of macroblocks. At intra/inter prediction stage 72, each macroblock can be encoded using either intra-frame prediction (i.e., within a single frame) or inter-frame prediction (i.e. from frame to frame). In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 3, the prediction macroblock can be subtracted from the current macroblock at stage 72 to produce a residual macroblock (residual). Transform stage 74 transforms the residual into transform coefficients in, for example, the frequency domain. Examples of block-based transforms include the Karhunen-Loève Transform (KLT), the Discrete Cosine Transform ("DCT") and the Singular Value Decomposition Transform ("SVD"). In one example, the DCT transforms the macroblock into the frequency domain. In the case of DCT, the transform coefficient values are based on spatial frequency, with the lowest frequency (i.e. DC) coefficient at the top-left of the matrix and the highest frequency coefficient at the bottom-right of the matrix.

Quantization stage 76 converts the transform coefficients into discrete quantum values, which are referred to as quantized transform coefficients or quantization levels. The quantized transform coefficients are then entropy encoded by entropy encoding stage 78. The entropy-encoded coefficients, together with the information required to decode the macroblock, such as the type of prediction used, motion vectors, and quantizer value, are then output to compressed bitstream 88. The compressed bitstream 88 can be formatted using various techniques, such as run-length encoding (RLE) and zero-run coding.

The reconstruction path in FIG. 3 is present to ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at an inverse transform stage 82 in order to produce a derivative residual macroblock (derivative residual). At reconstruction stage 84, the prediction macroblock that was predicted at intra/inter prediction stage 72 can be added to the derivative residual to create a reconstructed macroblock. A loop filter 86 can then be applied to the reconstructed macroblock to reduce distortion such as blocking artifacts.

Other variations of encoder 70 can be used to encode compressed bitstream 88. For example, a non-transform based encoder can quantize the residual signal directly without transform stage 74. In another embodiment, an encoder may have quantization stage 76 and dequantization stage 80 combined into a single stage.

Figure 4:
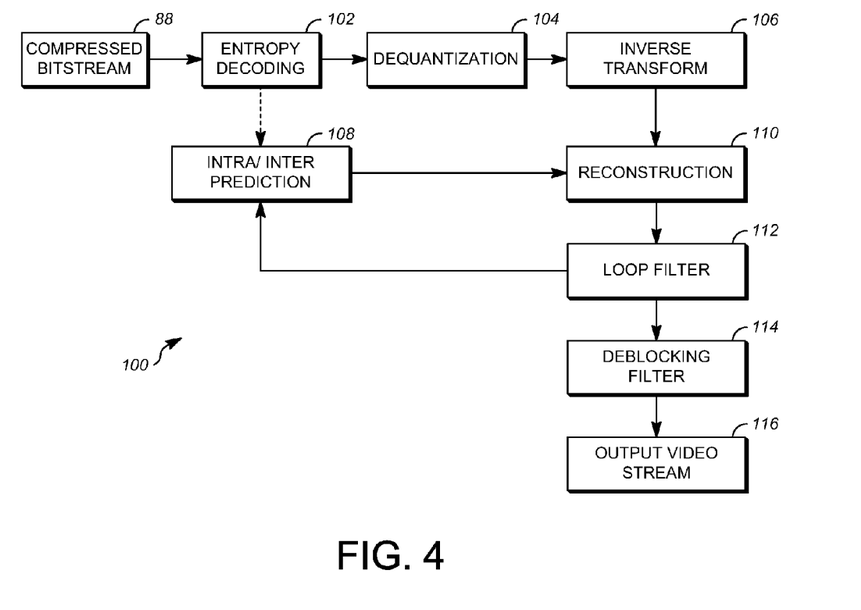
FIG. 4 is a block diagram of a decoder within the video encoding and decoding system of FIG. 1.

FIG. 4 is a block diagram of a decoder 100 within the video encoding and decoding system 10 of FIG. 1. Decoder 100, similar to the reconstruction path of the encoder 70 discussed previously, includes the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filter stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 (using, for example, Context Adaptive Binary Arithmetic Decoding) to produce a set of quantized transform coefficients. Dequantization stage 104 dequantizes the quantized transform coefficients, and inverse transform stage 106 inverse transforms the dequantized transform coefficients to produce a derivative residual that can be identical to that created by the reconstruction stage in the encoder 70. Using header information decoded from the compressed bitstream 88, decoder 100 can use intra/inter prediction stage 108 to create the same prediction macroblock as was created in encoder 70. At the reconstruction stage 110, the prediction macroblock can be added to the derivative residual to create a reconstructed macroblock. The loop filter 112 can be applied to the reconstructed macroblock to reduce blocking artifacts. Deblocking filter 114 can be applied to the reconstructed macroblock to reduce blocking distortion, and the result is output as output video stream 116.

Other variations of decoder 100 can be used to decode compressed bitstream 88. For example, a decoder may produce output video stream 116 without deblocking filtering stage 114.

As shown in FIGS. 3 and 4, loop filter 86 is the last stage of frame reconstruction in encoder 70 and loop filter 112 is the next-to-last stage of the decoding process in decoder 100. Loop filter 86 can be, for example, applied to the entire frame after the summation of the prediction and residue as described previously.

Loop filter 86 can act on the edges between adjacent macroblocks and on the edges between adjacent subblocks of a macroblock. Loop filter 86 can attempt (within limits), to reduce the difference between pixels straddling an edge. Differences in excess of, for example, a threshold can be unmodified; differences below the threshold can be reduced. Differences below the threshold can stem from, for example, quantization and the partially separate coding of blocks.

Each of the edges between adjacent macroblocks and on the edges between adjacent subblocks of a macroblock can be filtered, for example, horizontal, vertical or any other suitable edge. For each pixel position on an edge, a number of pixels (greater than 1) adjacent to either side of the pixel are examined and possibly modified (i.e. filtered). The displacements of these pixels can be at a right angle to the edge orientation, that is, for a horizontal edge, the pixels immediately above and below the edge position are possibly modified and for a vertical edge, the pixels immediately to the left and right of the edge are possibly modified.

Figure 5A:
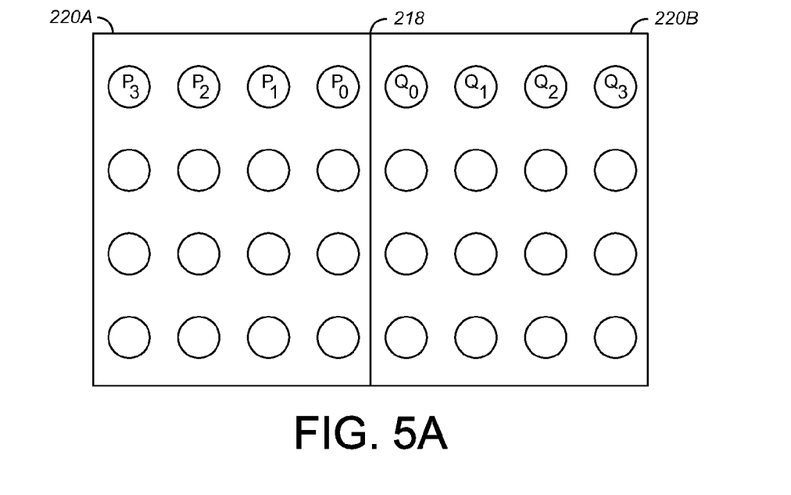
FIGS. 5A and 5B are schematic diagrams of blocks subject to loop filtering in the encoder and decoder of FIGS. 3 and 4.
Figure 5B:
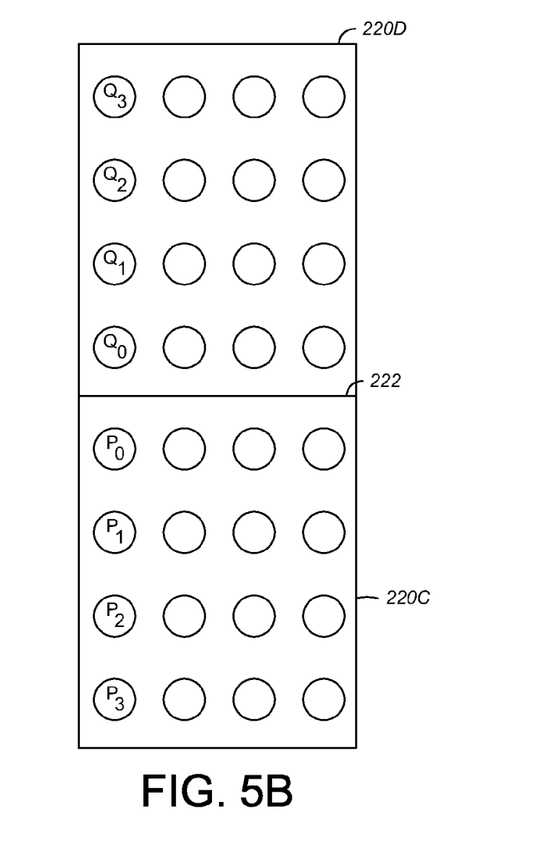

FIGS. 5A and 5B are schematic diagrams of blocks subject to loop filtering in the encoder and decoder of FIGS. 3 and 4. Referring to FIG. 5A, for example, loop filter 86 can act on a vertical edge 218 between adjacent subblocks 220a and 220b. Subblock 220a can have, for example, a 4×4 array of pixels (including $P_0$-$P_3$ . . . ) and subblock 220b can have, for example, a 4×4 array of pixels (including $Q_0$-$Q_3$ . . . ). Some current techniques filter along vertical edge 218 by examining the differences between adjacent pixel values (e.g. $P_0$ and $Q_0$). By examining the differences between these two adjacent pixels $P_0$ and $Q_0$, the loop filter 86 may determine whether to filter along the edge depending on whether the difference exceeds a predetermined threshold value. However, in some instances, it may be more suitable leave these pixels untreated.

Further, referring to FIG. 5B, for example, loop filter 86 can act on a horizontal edge 222 between adjacent subblocks 220c and 220d. Subblock 220c can have, for example, a 4×4 array of pixels (including $P_0$-$P_3$ . . . ) and subblock 220d can have, for example, a 4×4 array of pixels (including $Q_0$-$Q_3$ . . . ). Some current techniques (similar to that described above in FIG. 6A) filter along horizontal edge 222 by examining the differences between adjacent pixel values (e.g. $P_0$ and $Q_0$). By examining the differences between these two adjacent pixels $P_0$ and $Q_0$, the loop filter 86 may determine whether to filter along the edge depending on whether the difference exceeds a predetermined threshold value. As described previously, in some instances, it may be more suitable leave these pixels untreated.

According to one embodiment, the loop filter 86 examines the differences between two pixels on both sides of the edge. The following example will refer to filtering along vertical edge 218 in FIG. 6A although similar techniques may be used to filter along horizontal edge 222 in FIG. 6B. In one example, loop filter 86 can use pixels $P_1$, $P_0$, $Q_0$ and $Q_1$ to determine whether to filter along the vertical edge 218. Thus, a determination of whether to filter can be based, for example, formula (1):

$$|P_0-Q_0|*2+|P_1-Q_1|/2 \leq \text{EdgeLimit}; \quad (1)$$

wherein
$P_0$ is the value of the pixel before the edge;
$P_1$ is the value of the pixel before $P_0$;
$Q_0$ is the value of the pixel after the edge;
$Q_1$ is the value of the pixel after $Q_0$; and
EdgeLimit is the threshold limit to determine whether to filter.

The use of pixel values $P_1$ and $Q_1$ can permit loop filter 86 to more suitably suppress noise (i.e. turn filter on when difference is less than or equal to threshold) and determine when filtering should be skipped (i.e. turn filter off when difference is greater than threshold).

The EdgeLimit value can be dependent on the loop filter level, the sharpness level and the type of edge being processed. Of course, EdgeLimit may be dependent on factors in addition to or in lieu of those factors listed above.

Although, in this embodiment, two pixels on each side of the edge are used to determine whether loop filter 86 should be turned on or off, other embodiments may determine that three or another suitable number of pixels (on each side of the edge) are suitable.

Further, in another embodiment, a loop filter 86 can disable loop filter 86 if the differences between sets of pixels such as from the 8-pixel segment $P_3, P_2, P_1, P_0, Q_0, Q_1, Q_2$ and $Q_3$. are less than the relevant threshold "InteriorLimit". A more complex threshold calculation can be done for the group of four pixels that straddle the edge (i.e. $P_1, P_0, Q_0, Q_1$) which is similar to formula (1). Thus, a determination of whether to filter in this embodiment can be based, for example, on formula (2):

$$|P_0-Q_0|*2+|P_1-Q_1|/2 \leq \text{EdgeLimit} \ \& \ |P_3-P_2| \leq \text{InteriorLimit} \ \& \ |P_2-P_1| \leq \text{InteriorLimit} \ \& \ |P_1-P_0| \leq \text{InteriorLimit} \ \& \ |Q_3-Q_2| \leq \text{InteriorLimit} \ \& \ |Q_2-Q_1| \leq \text{InteriorLimit} \ \& \ |Q_1-Q_0| \leq \text{InteriorLimit}; \quad (2)$$

wherein
$P_0$ is the value of the pixel before the edge;
$P_1$ is the value of the pixel before $P_0$;
$P_2$ is the value of the pixel before $P_1$;
$P_3$ is the value of the pixel before $P_2$;
$Q_0$ is the value of the pixel after the edge;
$Q_1$ is the value of the pixel after $Q_0$;
$Q_2$ is the value of the pixel after $Q_1$;
$Q_3$ is the value of the pixel after $Q2$;
EdgeLimit is the threshold limit of differences between pixels adjacent to the edge (across blocks) to determine whether to filter at the edge; and
InteriorLimit is the threshold limit of differences between interior pixels (within a block) to determine whether to filter at the edge.

The operation of encoding and decoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The embodiments of transmitting station 12 and/or receiving station 30 (and the algorithms, methods, instructions etc. stored thereon and/or executed thereby) can be realized in hardware, software, or any combination thereof including, for example, IP cores, ASICS, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a handheld communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 30 implementation schemes are available. For example, receiving station 30 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for filtering a decoded video stream having a plurality of frames, each frame having a plurality of blocks, the method comprising:

selecting a current block from a current frame of the plurality of frames and an adjacent block from the current frame of the plurality of frames, the current block being adjacent to and sharing an edge with the adjacent block; and filtering the edge between the current block and the adjacent block, using a processor, if $|P_0-Q_0|*2+|P_1-Q_1|/2 \leq$ EdgeLimit & $|P_3-P_2| \leq$ InteriorLimit & $|P_2-P_1| \leq$ InteriorLimit & $|P_1-P_0| \leq$ InteriorLimit & $|Q3-Q2| \leq$ InteriorLimit & $|Q_2-Q_1| \leq$ InteriorLimit & $|Q_1-Q_0| \leq$ InteriorLimit; wherein:

$P_0$ is a pixel in the current block and a line of pixels that is immediately adjacent to the edge;

$P_1$ is a pixel in the current block and the line of pixels that is immediately adjacent to pixel $P_0$;

$P_2$ is a pixel in the current block and the line of pixels that is immediately adjacent to pixel $P_1$;

$P_3$ is a pixel in the current block and the line of pixels that is immediately adjacent to pixel $P_2$;

$Q_0$ is a pixel in the adjacent block and the line of pixels that is immediately adjacent to the edge;

$Q_1$ is a pixel in the adjacent block and the line of pixels that is immediately adjacent to pixel $Q_0$;

$Q_2$ is a pixel in the adjacent block and the line of pixels that is immediately adjacent to pixel $Q_1$;

$Q_3$ is a pixel in the adjacent block and the line of pixels that is immediately adjacent to pixel $Q_2$;

EdgeLimit is an edge threshold; and

InteriorLimit is an interior threshold.

2. The method of claim 1, wherein the edge is not filtered if $|P_0-Q_0|*2+|P_1-Q_1|/2$ is greater than the edge threshold or any comparison between adjacent pixels is greater than the interior threshold.

3. The method of claim 1, wherein the edge is filtered if $|P_0-Q_0|*2+|P_1-Q_1|/2$ is less than the edge threshold and none of the comparisons between adjacent pixels are greater than the interior threshold.

4. A method of filtering a video stream having a plurality of frames, each frame having a plurality of blocks, the method comprising:

determining an edge-detection result from an edge detection function of the values of at least four pixels within a line of pixels extending through a current block and an adjacent block, both blocks sharing an edge and being within a current frame of the plurality of frames, wherein the edge-detection function is defined as $|P_0-Q_0|*2+|P_1-Q_1|/2$; wherein:

$P_0$ is a pixel in the current block and the line of pixels that is immediately adjacent to the edge;

$P_1$ is a pixel in the current block and the line of pixels that is immediately adjacent to pixel $P_0$;

$Q_0$ is a pixel in the adjacent block and the line of pixels that is immediately adjacent to the edge; and $Q_1$ is a pixel in the adjacent block and the line of pixels that is immediately adjacent to pixel $Q_0$; and filtering the edge between current block and the adjacent block using a processor if the edge-detection result is less than an edge threshold.

5. The method of claim 4, wherein the edge is not filtered if the edge detection result of the edge detection function is greater than the edge threshold.

6. A computing device to filter a video stream having a plurality of frames, each frame having a plurality of blocks, the computing device comprising:

a memory; and a processor configured to execute instructions stored in the memory to:

select a current block from a current frame of the plurality of frames and an adjacent block from the current frame of the plurality of frames, the current block being adjacent to and sharing an edge with the adjacent block, and filter the edge between current block and the adjacent block if an output from an edge-detection function is less than or equal to an edge threshold, wherein the edge-detection function is defined as $|P_0-Q_0|*2+|P_1-Q_1|/2$; wherein:

$P_0$ is a pixel in the current block and a line of pixels that is immediately adjacent to the edge;

$P_1$ is a pixel in the current block and the line of pixels that is immediately adjacent to pixel $P_0$;

$Q_0$ is a pixel in the adjacent block and the line of pixels that is immediately adjacent to the edge; and $Q_1$ is a pixel in the adjacent block and the line of pixels that is immediately adjacent to pixel $Q_0$.

7. The computing device of claim 6, wherein the edge is not filtered if the output from the edge detection function is greater than the edge threshold.

* * * * *

UNITED STATES PATENT AND TRADEMARK OFFICE
CERTIFICATE OF CORRECTION

PATENT NO. : 8,638,863 B1  
APPLICATION NO. : 13/110283  
DATED : January 28, 2014  
INVENTOR(S) : Bankoski et al.

Page 1 of 1

It is certified that error appears in the above-identified patent and that said Letters Patent is hereby corrected as shown below:

On the title page

Page 2, item (56) "Other Publications", Left Column, Line 17, "20026" should be "2006".

Page 2, item (56) "Other Publications", Right Column, Line 1, "Bitstrea" should be "Bitstream".

Page 2, item (56) "Other Publications", Right Column, Line 4, "servies" should be "services".

Page 2, item (56) "Other Publications", Right Column, Line 8, "servies" should be "services".

Page 2, item (56) "Other Publications", Right Column, Line 12, "servies" should be "services".

Page 2, item (56) "Other Publications", Right Column, Line 13, "servies" should be "services".

Signed and Sealed this  
Fifteenth Day of April, 2014

Michelle K. Lee  
*Deputy Director of the United States Patent and Trademark Office*